United States Patent
Cole et al.

(10) Patent No.: US 11,414,164 B2
(45) Date of Patent: Aug. 16, 2022

(54) INSPECTION VEHICLE WITH MAINTENANCE TOOLS

(71) Applicant: Hitachi Energy Switzerland AG, Baden (CH)

(72) Inventors: Gregory A. Cole, West Hartford, CT (US); William J. Eakins, Bloomfield, CT (US); Daniel T. Lasko, Bloomfield, CT (US); Harshang Shah, Bloomfield, CT (US); Thomas A. Fuhlbrigge, Ellington, CT (US); Luiz V. Cheim, St. Charles, MO (US); Poorvi Patel, Ballwin, MO (US); Biao Zhang, West Hartford, CT (US); Saumya Sharma, Hartford, CT (US); Andrew Salm, West Hartford, CT (US)

(73) Assignee: Hitachi Energy Switzerland AG, Baden (CH)

( * ) Notice: Subject to any disclaimer, the term of this patent is extended or adjusted under 35 U.S.C. 154(b) by 60 days.

(21) Appl. No.: 16/434,643

(22) Filed: Jun. 7, 2019

(65) Prior Publication Data
US 2019/0389548 A1    Dec. 26, 2019

Related U.S. Application Data

(63) Continuation of application No. PCT/IB2017/001622, filed on Dec. 6, 2017.
(Continued)

(51) Int. Cl.
*B63G 8/00* (2006.01)
*B63G 8/16* (2006.01)
(Continued)

(52) U.S. Cl.
CPC ........... *B63G 8/001* (2013.01); *B63G 8/16* (2013.01); *G01N 21/954* (2013.01);
(Continued)

(58) Field of Classification Search
CPC .... B63G 8/001; B63G 8/16; B63G 2008/004; B63G 2008/005; G01N 21/954;
(Continued)

(56) References Cited

U.S. PATENT DOCUMENTS

| 4,502,407 A | 3/1985 | Stevens |
| 6,219,399 B1 | 4/2001 | Naruse et al. |

(Continued)

FOREIGN PATENT DOCUMENTS

| EP | 2762279 A1 | 8/2014 |
| JP | S60-4699 A | 1/1985 |

(Continued)

OTHER PUBLICATIONS

International Bureau of WIPO, International Preliminary Report on Patentability issued in corresponding Application No. PCT/IB2017/001622, dated Jun. 20, 2019, 11 pp.
(Continued)

*Primary Examiner* — Moshe Wilensky
(74) *Attorney, Agent, or Firm* — Sage Patent Group

(57) ABSTRACT

An inspection vehicle operable for performing one or more maintenance and repair operations in a housing filled at least partially with a liquid medium is disclosed in the present application. The inspection vehicle includes a propulsion device operable in the liquid medium and includes at least one sensor operable for sensing and transmitting data associated therewith. A control system including an electronic controller is in electronic communication with the inspection vehicle to transmit and receive communication signals to/from the inspection vehicle. One or more maintenance
(Continued)

tools operable with the inspection vehicle are configured to perform maintenance and/or repair operations within the liquid filled housing.

29 Claims, 11 Drawing Sheets

Related U.S. Application Data

(60) Provisional application No. 62/431,316, filed on Dec. 7, 2016.

(51) Int. Cl.
    *G01N 21/954*     (2006.01)
    *G05D 1/00*     (2006.01)
    *G21C 17/013*     (2006.01)
    *G21C 17/017*     (2006.01)

(52) U.S. Cl.
    CPC ......... *G05D 1/0094* (2013.01); *G21C 17/013* (2013.01); *G21C 17/017* (2013.01); *B63G 2008/004* (2013.01); *G05D 1/0038* (2013.01); *G05D 1/0044* (2013.01)

(58) Field of Classification Search
    CPC .. G05D 1/0094; G05D 1/0038; G05D 1/0044; G05D 1/0692; G21C 17/013; G21C 17/017; Y02E 30/30; G01M 3/005; H01F 27/12

See application file for complete search history.

(56) References Cited

U.S. PATENT DOCUMENTS

2007/0125289 A1    6/2007   Asfar et al.
2016/0060887 A1    3/2016   Tryber et al.
2019/0325668 A1*   10/2019   Cole ........................ G01N 1/22

FOREIGN PATENT DOCUMENTS

JP            H0694885 A      4/1994
KR           100637865 B1    10/2006

OTHER PUBLICATIONS

European Patent Office, International Search Report & Written Opinion issued in corresponding Application No. PCT/IB2017/001622, dated Jun. 19, 2018, 18 pp.

Summons to Attend Oral Proceedings Pursuant to Rule 115(1) EPC, European Patent Application No. 17840569.2, dated Feb. 17, 2021, 10 pages.

* cited by examiner

INSPECTION VEHICLE WITH MAINTENANCE TOOLS

TECHNICAL FIELD

The present application generally relates to an inspection vehicle having tools to perform maintenance procedures and more particularly, but not exclusively, to a liquid propelled inspection vehicle having one or more maintenance tools for performing vacuum and repair procedures in a liquid filled housing such as a transformer or the like.

BACKGROUND

An apparatus with a liquid-filled housing such as a power transformer or the like needs periodic inspection and maintenance. Liquid-filled housings are configured to hold electrically powered components and are often extremely heavy and difficult to transport and/or replace. In-situ inspection and maintenance can be a desirable alternative to replacement of such an apparatus. It is possible to drain the liquid from the housing prior to inspecting and repairing internal components, however this is a time consuming and expensive process. Therefore, it can be desirable to perform inspection and maintenance procedures on components within the liquid filled housing without draining the liquid therefrom. Some existing systems have various shortcomings relative to certain applications. Accordingly, there remains a need for further contributions in this area of technology.

SUMMARY

One embodiment of the present application is an inspection vehicle operable in a liquid filled housing and more particularly, but not exclusively, to an inspection vehicle with one or more maintenance tools for performing maintenance on components in a liquid filled housing such as a transformer or the like. Other embodiments include apparatuses, systems, devices, hardware, methods, and combinations for an inspection vehicle with maintenance and repair tools. Further embodiments, forms, features, aspects, benefits, and advantages of the present application shall become apparent from the description and figures provided herewith.

BRIEF DESCRIPTION OF THE FIGURES

FIG. 10A is a perspective view of one embodiment of an inspection vehicle with a maintenance tool;

FIG. 10B is an enlarged side view of a portion of the inspection vehicle showing a filter attachment bracket coupled thereto;

DETAILED DESCRIPTION OF THE ILLUSTRATIVE EMBODIMENTS

Figure 1:
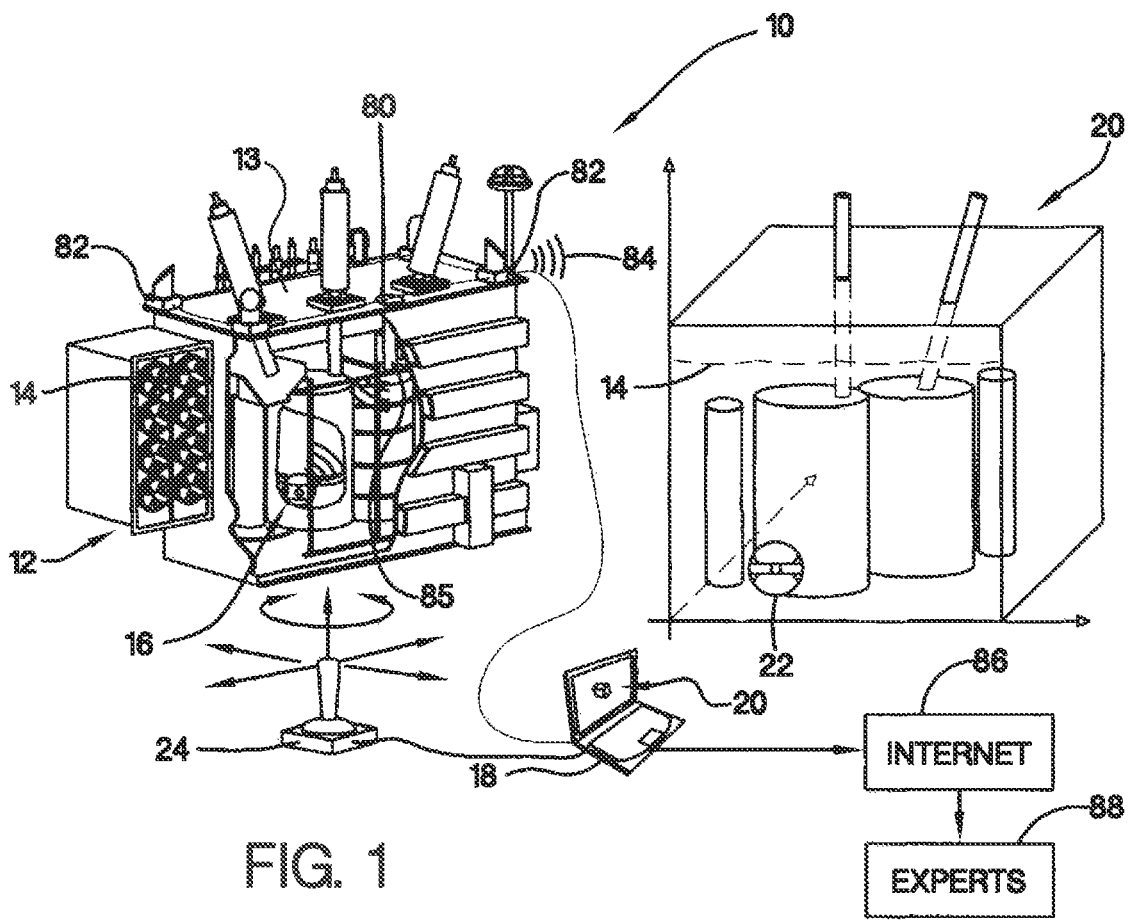
FIG. 1 is a schematic diagram of a system for in-situ inspection according to one exemplary embodiment of the present disclosure.

For the purposes of promoting an understanding of the principles of the application, reference will now be made to the embodiments illustrated in the drawings and specific language will be used to describe the same. It will nevertheless be understood that no limitation of the scope of the application is thereby intended. Any alterations and further modifications in the described embodiments, and any further applications of the principles of the application as described herein are contemplated as would normally occur to one skilled in the art to which the application relates.

Referring to FIG. 1, a system for in-situ inspection of a liquid filled transformer designated generally by the numeral 10 is illustrated. It should be understood that while liquid filled electrical transformers are described and referenced in this application, the systems and methods described herein are not limited to liquid filled transformers, but on the contrary can be used with any liquid filled housing or container wherein physical inspection, data collection, data transmittal and repair procedures or the Ike are desired without prior draining of the liquid from the housing. By way of example, and not limitation, in-situ inspection may be performed on portions of ship hulls, electrical interrupters, high voltage switch gears, nuclear reactors, fuel tanks, food processing equipment, floating roof storage system, chemical storage tank, or other apparatuses of similar nature.

In one exemplary embodiment, the system 10 can be used for inspection, data transmittal and/or maintenance of a transformer 12. The transformer 12 contains high-voltage electrical components immersed in a cooling fluid 14 such as oil. Skilled artisans will appreciate that the inspection typically occurs when the transformer 12 is offline or not in use. The transformer 12 utilizes the cooling fluid 14 to maintain temperature and disburse heat generated by the internal components during operation of the transformer 12. In some embodiments, the cooling fluid 14 can include dielectric properties such that electrical conduction is reduced or entirely eliminated in the fluid 14. The transformer 12 can be maintained in a sealed configuration so as to prevent contaminants or other foreign matter from entering therein. As used herein, a "sealed configuration" of the tank or housing 13 allows for conduit ducts or other hardware associated with the transformer 12 to extend through a wall via a sealed joint formed with the housing 13 to allow for connection to electrical components and/or monitoring devices maintained in the housing 13. The housing 13 includes at least one opening to allow for ingress into and egress out of the housing 13. An inspection vehicle 16 sometimes referred to as a "robot," is insertable into the housing 13 of the transformer 12 and is controlled either by un-tethered wireless remote control or through a tether connection. In some embodiments an inspection vehicle or a separable portion thereof may be submersible without having self-propelled motion capability.

A computational device 18, such as a laptop computer or other appropriate computing device can communicate with the inspection vehicle 16 either by direct connection through a tether or wirelessly. The computer 18 may maintain a virtual transformer image 20 of the internal construction of the transformer 12. In some embodiments, this virtual image can be a computer-aided-design (CAD) image generated in construction or design of the transformer 12. However, in other forms, images such as photographs or actual real time video generated by sensors and cameras associated with the inspection vehicle 16 may be utilized. As will be described in further detail, the computer 18 may utilize the virtual transformer image 20 in conjunction with a virtual inspection vehicle 22, to represent the actual inspection vehicle 16, so as to monitor the positioning of the inspection vehicle 16 within the transformer 12. A motion control input device, such as a joystick 24 can be connected to the computer 18 and/or directly to the inspection vehicle 16 to allow an operator to control movement of the inspection vehicle 16 inside the transformer 12. Control of the inspection vehicle 16 can be aided by observations of the virtual inspection vehicle 22 as it moves about the virtual transformer image 20. In other words, an operator can control movement of the inspection vehicle 16 based on the observed position of the inspection vehicle 16 within the transformer 12. Other types of motion control input devices, such as those used in video games, handheld computer tablets, computer touch screens or the like may be employed without deviating from the teachings herein. It should be understood that in some applications the operator may be located on-site or near the apparatus to be inspected. However, in other applications the operator may be located off-site and indeed anywhere in the world through communication via World Wide Web internet connection.

Figure 2:
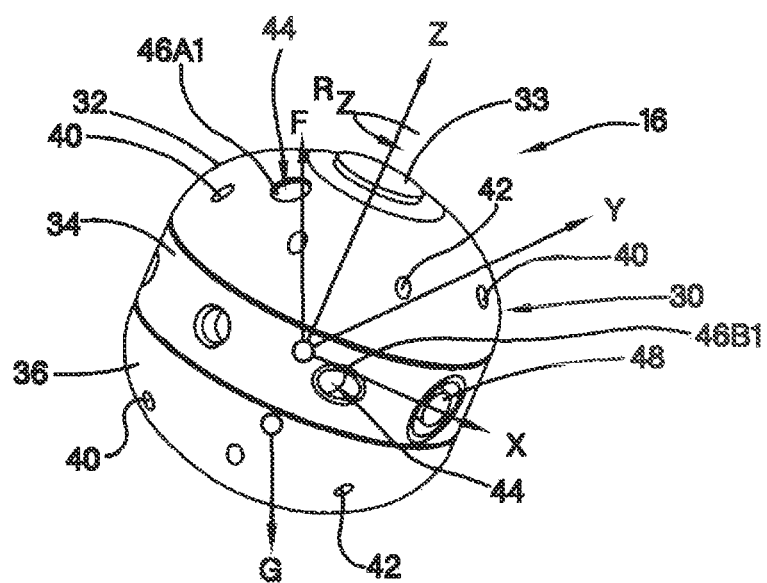
FIG. 2 is a perspective view of an inspection vehicle used within the system according to one exemplary embodiment of the present disclosure.
Figure 3:
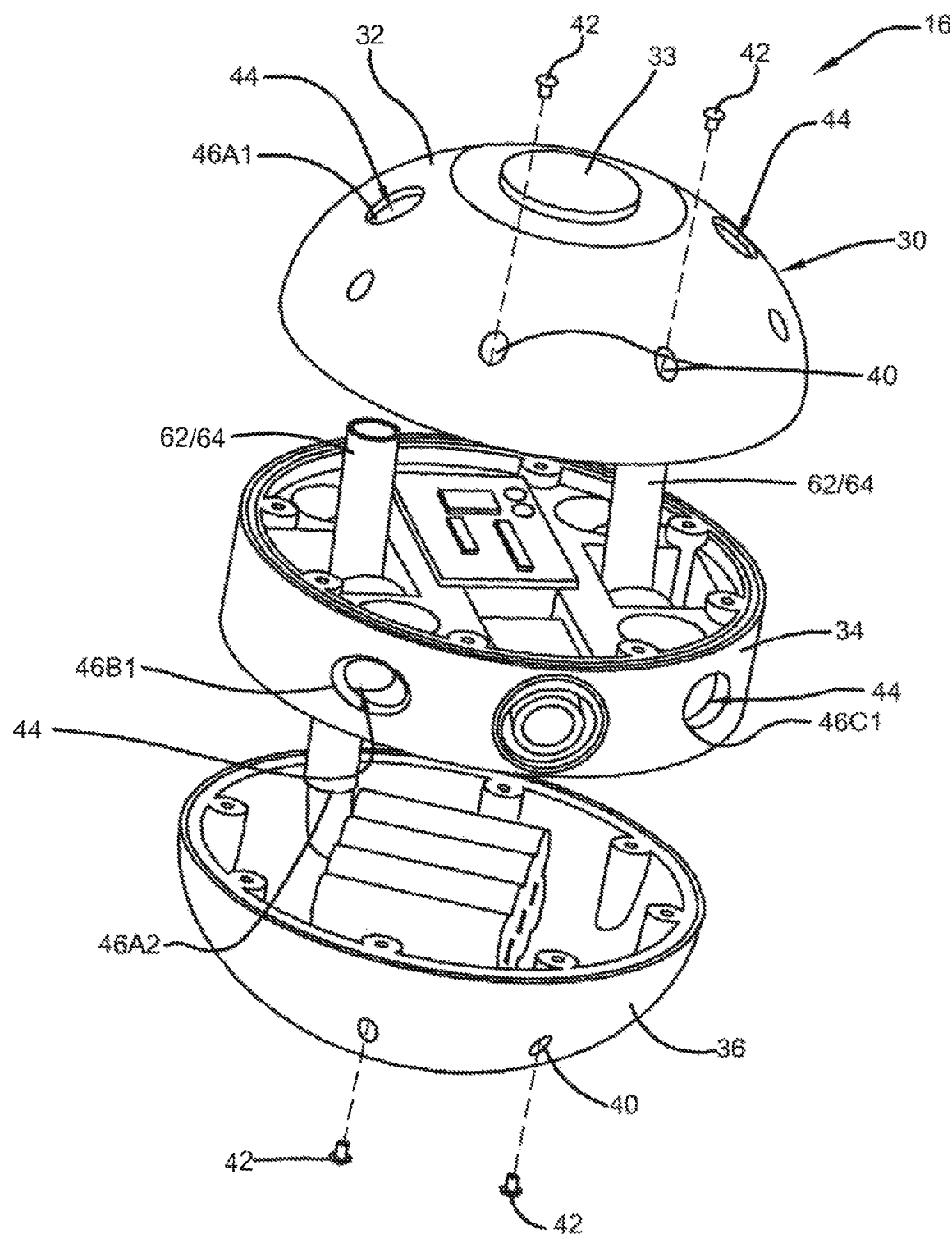
FIG. 3 is an exploded view of the inspection vehicle used within the system according to one exemplary embodiment of the present disclosure.
Figure 4:
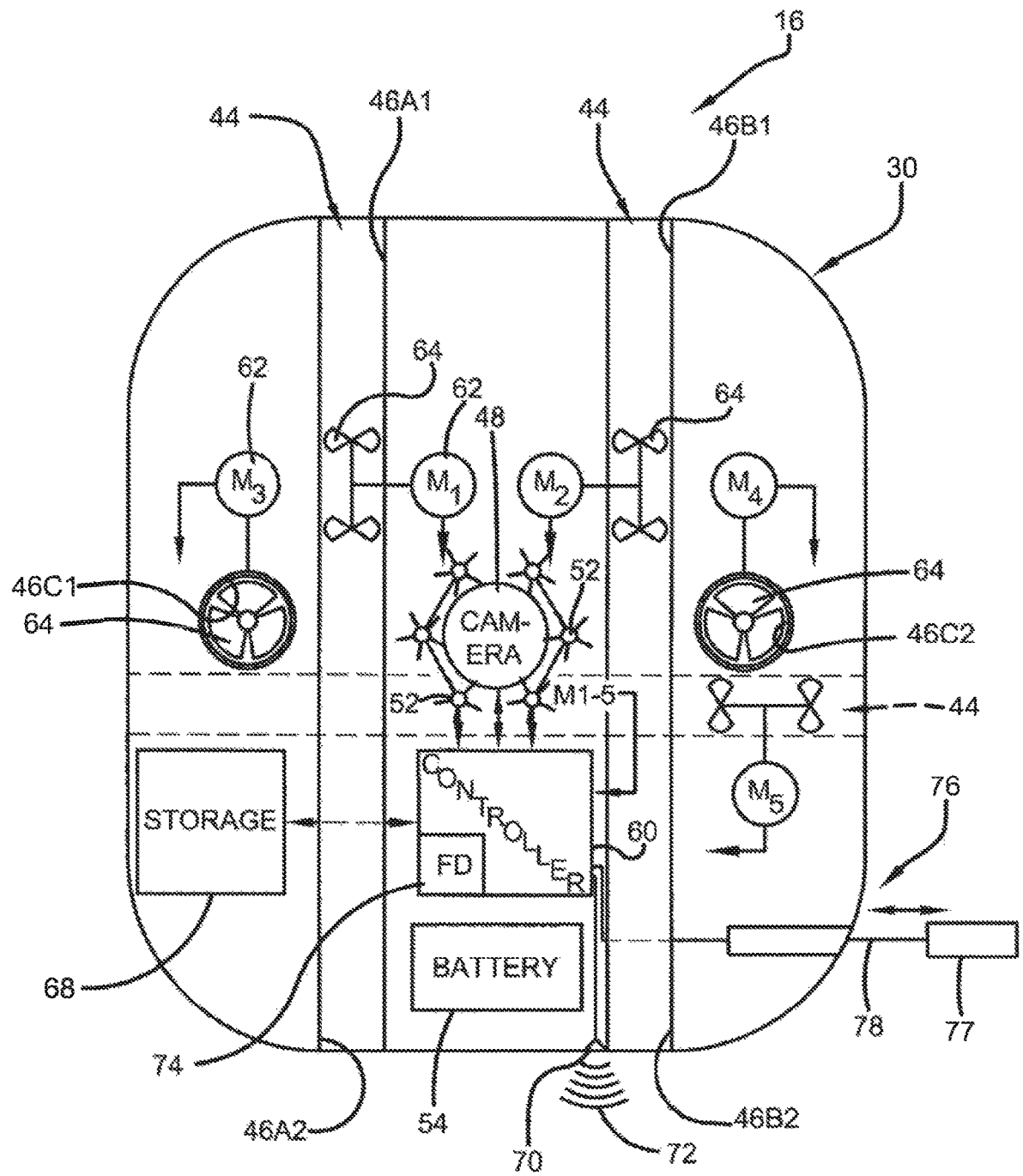
FIG. 4 is a schematic diagram of the inspection vehicle according to one exemplary embodiment of the present disclosure.

Referring now to FIGS. 2-4, the inspection vehicle 16 includes a vehicle housing 30 that is substantially cylindrical or spherical in construction with no significant protrusions or extensions that might otherwise be entangled with the internal components within the transformer 12. The vehicle housing 30 of the inspection vehicle 16 includes an upper cover 32 having a minimally extending nub 33, a middle section 34 and a lower cover 36. The nub 33 is sized so as to allow for grasping of the inspection vehicle 16 from within the transformer 12 by a tool or by an operator's hand. The nub 33 could have other shapes, such as a loop, to facilitate easy grasping, depending on the type of tool used to grasp the inspection vehicle 16. The cover 32, the middle section 34 and the cover 36 can be secured to one another with fastener apertures 40 that extend through at least the covers 32 and 36 so as to receive fasteners 42 to allow for attachment to the middle section 34. In most embodiments the fasteners 42 are maintained flush with the surface of the cover so as to minimize drag and prevent entanglement with internal components of the transformer 12. Other forms of mechanical fastening may be used, such as threaded engagement, press-fit, or mechanical clip or the like. Further, in some embodiments, the inspection vehicle 16 may only include two sections and in other embodiments the inspection vehicle 16 may include four or more sections.

Extending through the vehicle housing 30 are at least two pump flow channels designated generally by the numeral 44. These channels extend vertically and horizontally through the vehicle housing 30 and are configured so as to be sealed from the internal components of the vehicle housing 30. Each flow channel 44 provides a pair of ports 46. As shown in the drawings, numeric and alphabetic designations are provided so as to identify particular ports. For example, port 46A1 is at one end or side of the vehicle housing 30 while the opposite end of the flow channel 44 is designated by port 46A2. As such, the fluid maintained within the transformer can flow from one port 46A1 through and exit out port 46A2. In a similar manner, the oil may flow through port 46B1 and out through port 46B2. As will be discussed, components maintained within the channels move the fluid in either direction, through the inspection vehicle 16 and thus allow the inspection vehicle 16 to move within the transformer 12. It should be appreciated that alternate flow channel configurations could be implemented. For example, fluid could enter the inspection vehicle 16 through a single inlet and internal valves could route the fluid to all outlet ports. In another example, the vertical path could have one inlet port and two or more outlet ports. At least one sensor 48 is carried by the vehicle housing 30 and in some embodiments the sensor 48 is a camera. Other sensors can be used in some embodiments such as, by way of non-limiting examples, proximity sensors, acoustic sensors, electromagnetic sensors, voltage sensors, amperage sensors, pressure sensors and temperature sensors. The camera 48 is configured to receive and transmit images through a plurality of wavelength images of the internal components of the transformer 12. The wavelengths can include visible, infrared, or others as desired. These images allow an operator to monitor and inspect various components within the transformer 12.

In some embodiments, the vehicle housing 30 can include one or more light sources 52 which facilitate illumination of the area surrounding the inspection vehicle 16. In some embodiments the lights 52 can be light emitting diodes, but it will be appreciated that other illumination devices can be used. For example, one or more of the lights 52 can include ultraviolet (UV) frequencies that may be used to cure UV hardened adhesives or the like. The illumination devices are oriented so as to illuminate the viewing area of the camera 48. In some embodiments, the operator can control the intensity and wavelength of the light.

A battery pack 54 is maintained within the inspection vehicle 16 so as to power the internal components such as the sensor 48, the lights 52 and a controller 60. The controller 60 operates the sensor 48 and lights 52 and also controls operation of a motor 62 and a pump 64 which are used in combination with each of the provided pump flow channels 44. The controller 60 maintains the necessary hardware and software to control operation of the connected components and maintain the ability to communicate with the computer 18 as well as with other devices. The controller 60 provides functionality in addition to controlling the motion of the inspection vehicle 16. For example, the controller 60 can provide for a data recording function so that a high-resolution, high-speed video of the entire inspection area generated by the sensor 48 can be recorded and stored onboard by the storage device 68. On board storage may be used in instances where wireless streaming of the video is interrupted or the antenna transmission of the wireless signals has a lower than desired bandwidth. Skilled artisans will appreciate that the sensor 48 may also be a thermal camera, a sonar sensor, a radar sensor, a three-dimensional vision sensor, or any combination of sensors.

Each motor 62 is reversible so as to control the flow of fluid through the flow channels by the pump 64. In other words, each motor is operated independently of one another so as to control operation of the associated pump 64 such that rotation of the pump 64 in one direction causes the fluid to flow through the flow channel 44 in a specified direction and thus assist in propelling the vehicle housing 30 in a desired direction. The pump 64, which may also be referred to as a thruster pump, is shown as being a propeller type configuration, but other configurations such as a paddle-type pump or gear pump could be utilized.

In some embodiments, a single motor may be used to generate a flow of fluid through more than one channel. In other words, the vehicle housing 30 could provide a single inlet and two or more outlets. Valves maintained within the vehicle housing 30 could be used to control and re-direct the internal flow of the fluid and, as a result, control movement of the vehicle housing 30 within the transformer tank or housing 13. By coordinating operation of the motors with the controller, and thus the oil flowing through the vehicle housing 30, the inspection vehicle 16 can traverse all areas having sufficient space within the transformer 12. Moreover, the inspection vehicle 16 is able to maintain an orientational stability while maneuvering in the transformer tank or housing 13. In other words, the inspection vehicle 16 is stable such that it will not move end-over-end while moving within the transformer tank or housing 13. The vehicle housing 30 of the inspection vehicle 16 provides for a center of gravity designated by the capital letter G. The inspection vehicle 16 components are designed so that the center of gravity G is lower than the center of the buoyant force of the inspection vehicle 16 designated by the capital letter F. As skilled artisans will appreciate, this enables the inspection vehicle 16 to be provided with stability during traversal motion.

The vehicle housing 30 also carries a data storage device 68 which collects the data from the sensor 48 and is adequately sized to provide for storage of video or still images taken by a camera. The storage device 68 is connected to the controller 60 so as to provide for reliable transfer of the data from the sensor/camera 48 to the storage device 68. It will be appreciated that in some embodiments the storage device 68 is connected directly to the sensor 48 and the controller receives the data directly from the storage device 68. An antenna 70 is connected to the controller 60 for the purpose of transmitting data collected from the sensor 48 and also for sending and receiving control signals for controlling the motion and/or direction of the inspection vehicle 16 within the transformer 12. The antenna generates a wireless signal 72 that can be detected by the computer 18 or any intermediate device. A failure detection module 74 (designated as FD in FIG. 4) may be included in the controller 60 so as to shut down the internal components within the inspection vehicle 16 if a system failure is detected. For example, if a low battery level is detected by the controller 60, the module 74 and the controller 60 can begin a controlled shutdown of the inspection vehicle 16 which would cause the inspection vehicle 16 to float to the surface due to its positive buoyancy. In another example, a loss of connection to the remote system could also trigger a shutdown.

After floating to the surface, the vehicle housing 30 can be grasped by the nub 33. A borescope 76 may also be carried by the vehicle housing 30. One end of the borescope provides a camera 77 or other sensor connected to a retractable fiber-optic cable 78 which is connected at its opposite end to the controller 60. When in a retracted position the camera 77 is flush with the surface of the vehicle housing 30 so as to prevent entanglement with the components inside the transformer 12. When inspection of hard to view items is needed, such as the windings of the transformer 12, the cable 78 is extended while the inspection vehicle 16 is maintained in a stationary position. After images and other data are collected by the camera 77, the cable 78 is retracted. As a result, the borescope 76 allows further detailed inspection of the transformer 12.

As noted previously, the inspection vehicle 16 is configured so as to easily move around the obstacles within the transformer 12. The vehicle housing 30 is a cylindrical-shaped with sphere ends or sphere shaped configuration and is provided with a buoyant design so as to allow the inspection vehicle 16 to float to the top of the oil when it is powered off purposefully or accidentally. The inspection vehicle 16 is configured so as to allow for the thruster pumps 64 to move the inspection vehicle 16 around by selective actuation of each pump. As a result, the inspection vehicle 16 has four degrees of freedom or motion: X, Y, Z and rotation around Z. As a result, by controlling the direction of the pump thrusters 64, the inspection vehicle 16 can be easily moved.

Referring back to FIG. 1, it can be seen that the transformer 12 has at least one transformer hole 80. In general operation, the oil is inserted through any number of holes located in the top of the tank. Holes 80 may also be provided at the bottom of the tank to allow for the fluid to be drained. The holes 80 are provided with the appropriate plugs or caps. Accordingly, it will be appreciated that the size of the inspection vehicle 16 must be such that it can fit within the hole 80.

The transformer 12 may be configured with a plurality of transmit signal receivers 82 mounted on the upper corners, edges or other areas of the transformer 12, or in nearby proximity to the transformer 12. The transmit signal receivers 82 receive the wireless signal 72 from the inspection vehicle 16 to determine the position of the inspection vehicle 16 in the transformer tank or housing 13. The receivers 82 use triangulation, based on the signals 72 received or other methodology, to determine a position of the inspection vehicle 16 in the transformer tank or housing 13. This position information is then transmitted by a signal 84, either wired or wirelessly, to the computer 18. Additionally, the information collected by the sensor 48, such as visual data, is transferred to the computer or other visual receiving device separately. In other words, the informational data generated by the sensor 48 is transmitted to the computer 18 through the fluid and the tank wall with the openings 80. Use of these different communication paths may be used to prevent interference between the signals; however, some embodiments may utilize the same communication path to transfer data related to positioning, data information, and control information as appropriate. Reliable communication for the motion control of the inspection vehicle 16 and data/video streaming are required for the transformer 12 in-situ inspection. Utilizing the dielectric feature of the transformer coolant oil, the inspection vehicle 16 can be controlled by radio frequencies rather effectively. The video streaming for a Wi-Fi camera (e.g. 4.2 GHz) has been proven to be sufficient. To ensure reliable communication between the inspection vehicle 16 and the computer 18, a transceiver 85 may be inserted into the cooling oil tank through the service opening on the top of the transformer 12.

In most embodiments, the transceiver 85 is used to exchange data information from the sensor 48 and the camera 77, via the controller 60 to the computer 18; and motion control or maneuvering signals from the joystick 24 via the computer 18 to the controller 60 so as to operate the motors 62 and thrusters 64. The signal 84, transmitted by the receiver 82 is used by the computer 18 to provide a separate confirmation of the position of the inspection vehicle 16 within the transformer tank or housing 13.

The computer 18 receives the position signals 84 and information signals 72 and in conjunction with the virtual image 20 correlates the received signals to the virtual image so as to allow an operator to monitor and control movement of the inspection vehicle 16. This allows the operator to inspect the internal components of the transformer 12 and pay particular attention to certain areas within the transformer 12 if needed. By utilizing a virtual image of the internal features of the transformer 12 and the position of the inspection vehicle 16 with respect to those virtual features, the image obtained can be matched with the corresponding site inside the actual transformer tank or housing 13. Based on the visual representation of the transformer image 20 and the virtual inspection vehicle 22 in relation to the image, an operator can manipulate the joystick 24 response. The computer 18 receives the movement signals from the joystick 24 and transmits those wirelessly to the antenna 72, whereupon the controller 60 implements internally maintained subroutines to control the pump thrusters 64 to generate the desired movement. This movement is monitored in real-time by the operator who can re-adjust the position of the inspection vehicle 16 as appropriate.

In some embodiments the computer 18 can be connected to a network 86, such as the internet, so as to allow for the images or sensor data to be transferred to experts, who may be remotely located, designated by the block 88 so that their input can be provided to the operator so as to determine the nature and extent of the condition within the transformer 12 and then provide corrective action as needed. In some embodiments, control of the inspection vehicle 16 can also be transferred to an expert, who may be remotely located. In such embodiments, the expert would have another computer that can send control signals via a network to the local computer 18 that in turn sends signals to control the inspection vehicle 16 as described above.

Figure 5:
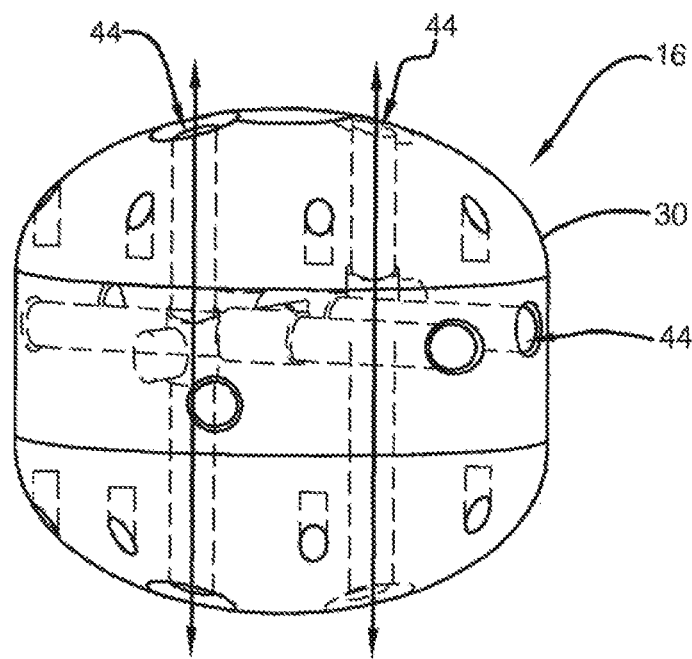
FIG. 5 is a schematic diagram of the inspection vehicle according to one exemplary embodiment of the present disclosure where two pumps under one control move the device in the Z direction.

Referring now to FIGS. 5-9, it can be seen that control of the motors and pump thrusters and their direction of fluid flow through the channels can control the motion of the inspection vehicle 16 within a fluid. For example, FIG. 5 shows the utilization of two pumps under one control so as to move the inspection vehicle 16 in a Z direction (see FIG. 2). To drive along the Z axis and to remain a stable depth, the Z axis thrusters have to run continuously. The Z thruster action can be controlled either manually by the operator or automatically by the controller. As used herein, the terminology "one control" refers to operating two pumps to operate in conjunction with one another so that the fluid flow is uniformly in one direction or the other.

Figure 6:
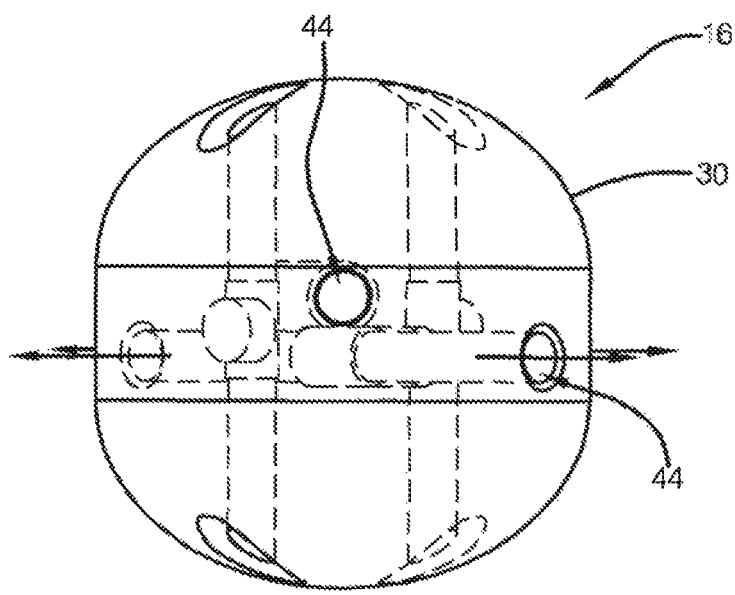
FIG. 6 is a schematic diagram of the inspection vehicle according to one exemplary embodiment of the present disclosure where two pumps under two controls move the device in the X direction.
Figure 7:
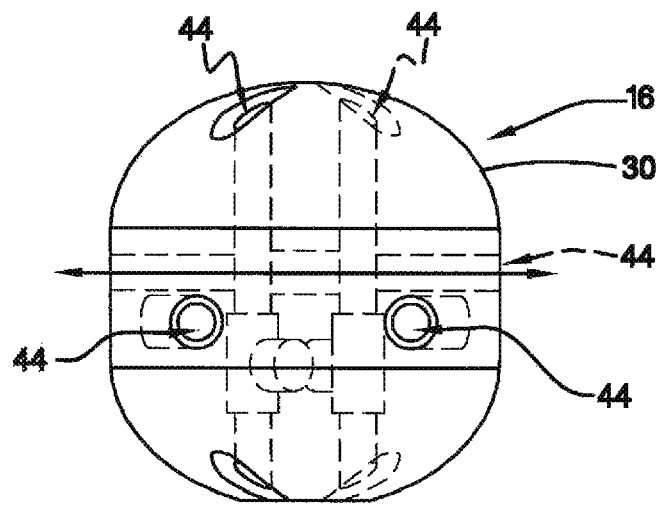
FIG. 7 is a schematic diagram of the inspection vehicle according to one exemplary embodiment of the present disclosure where a single pump under one control moves the device in the Y direction.

In FIG. 6 it can be seen that an X direction (see FIG. 2) can be obtained by utilizing two pumps under two controls so as to allow for movement in an X direction. As used herein, operation of "two pumps under two controls" means that the controller operates the pumps separately from one another. In FIG. 7 it can be seen that the inspection vehicle 16 is movable along the Y direction (see FIG. 2) wherein one pump is utilized under one control. It will be appreciated that FIG. 7 is a side view of FIG. 6 and at a slightly different elevation with respect to the X directional flow channels. As mentioned above, other embodiments could use different combinations of channels. For example, the three or four channels could exist in the Z direction. Also, other embodiments could have one inlet port and two outlet ports for a channel, or vice versa, or even use a different number of inlets and outlets. The number of pumps could also vary. For example, one pump could be used to control the flow of fluid from one inlet port which is then output through four outlet ports.

Figures 8A, 8B:
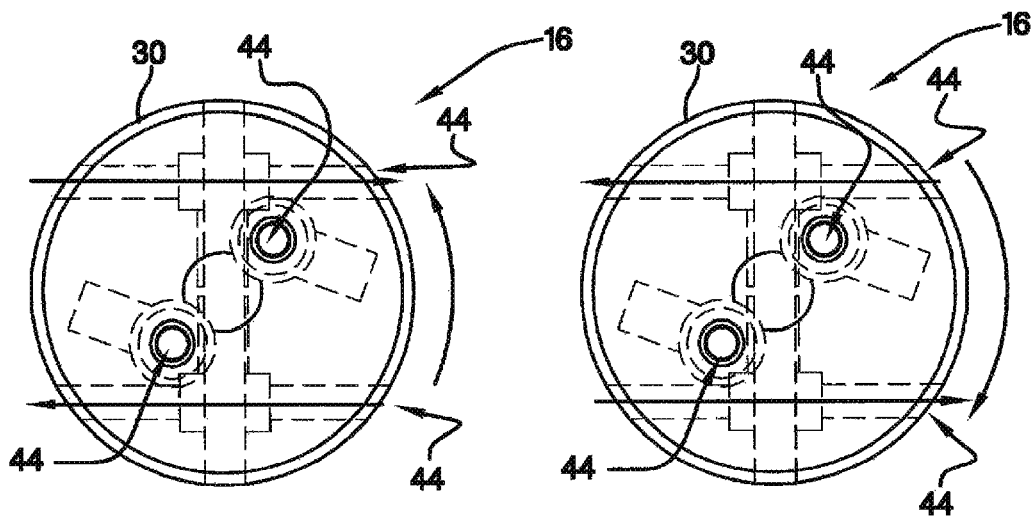
FIGS. 8A and 8B are schematic diagrams of the inspection vehicle according to one exemplary embodiment of the present disclosure wherein two pumps under one control operate to rotate the device in a counter-clockwise direction and in a clockwise direction, respectively.
Figure 9A:
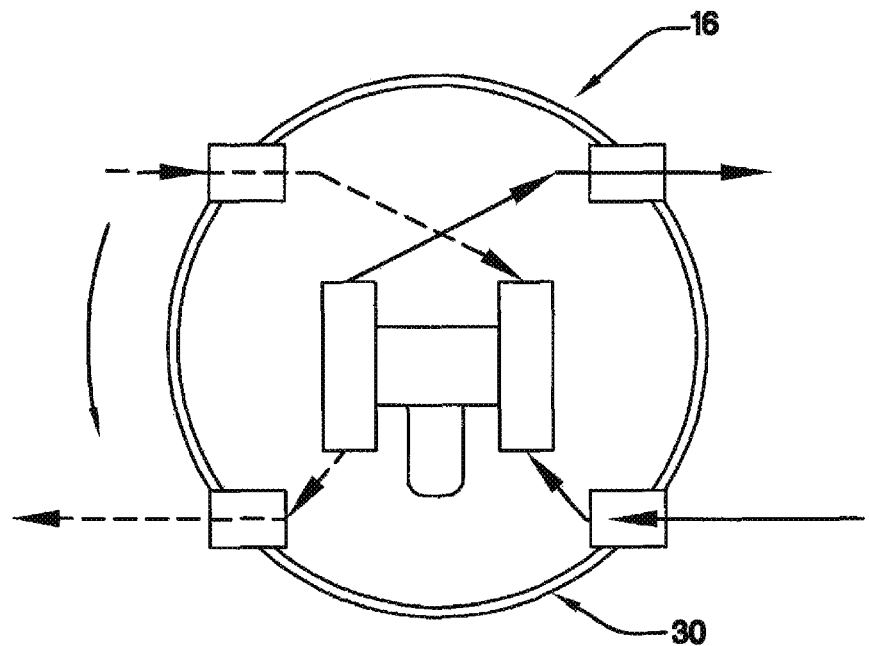
FIGS. 9A and 9B are schematic diagrams of the inspection vehicle according to one exemplary embodiment of the present disclosure wherein one pump operates to rotate the vehicle in a counter-clockwise direction and in a clockwise direction, respectively.
Figure 9B:
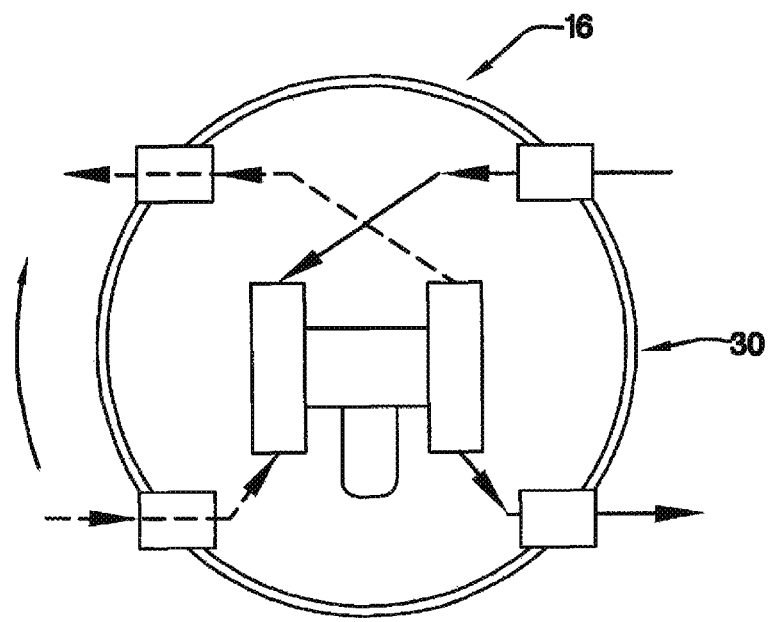

In FIGS. 8A and 8B it can be seen that two pumps under one control allow for rotation of the inspection vehicle 16. In FIG. 8A, by directing the fluid flow in one direction through one channel and an opposite direction in another channel, counter-clockwise rotation can be obtained. By reversing the flows in both channels, clockwise rotation can be obtained as seen in FIG. 8B. In another variation, FIGS. 9A and 9B show rotation of the inspection vehicle 16 utilizing one pump under one control wherein the flow is directed from one side of the inspection vehicle 16 into the inspection vehicle 16 and then back out the same side. A corresponding flow is provided by the opposite side of the inspection vehicle 16 so as to provide for rotation about the Z axis. Reversing the flow provides a corresponding reversal of the rotation of the inspection vehicle 16 along the Z axis.

The inspection vehicle 16 allows for visual and other inspection without draining the transformer oil. This is accomplished by being able to control the inspection vehicle 16 in the oil and perform visual or other inspection through the oil. The inspection vehicle 16 is constructed to be resistant to an oil environment and is properly sealed. Additionally, the inspection vehicle 16 is small enough to be put inside a transformer tank or housing 13 using existing service holes, e.g. those used for filling the transformer oil. As a result, it is not needed to unseal the transformer tank top completely. Another aspect is that the inspection vehicle 16 can be controlled from the outside of the transformer using a joystick 24 and computing device 18 which may also be used for displaying visual data from the sensor(s).

As internal regions of a transformer have no ambient light, the sensor 48 utilizes a supporting light source carried by the inspection vehicle 16. Various wavelengths of light may be used (visible and/or non-visible light) for detailed inspection of the transformer 12 components inside. A remotely controlled arm that guides a thin fiber-optic camera head inside the transformer 12 winding block may also be used. Still another aspect of the inspection vehicle 16 is that all materials employed in the construction of the inspection vehicle 16 are oil compatible. This is to avoid any type of contamination introduced by the inspection vehicle 16, so that the transformer 12 can directly return to operation after the inspection of inspection vehicle 16 without oil treatment.

Figure 10C:
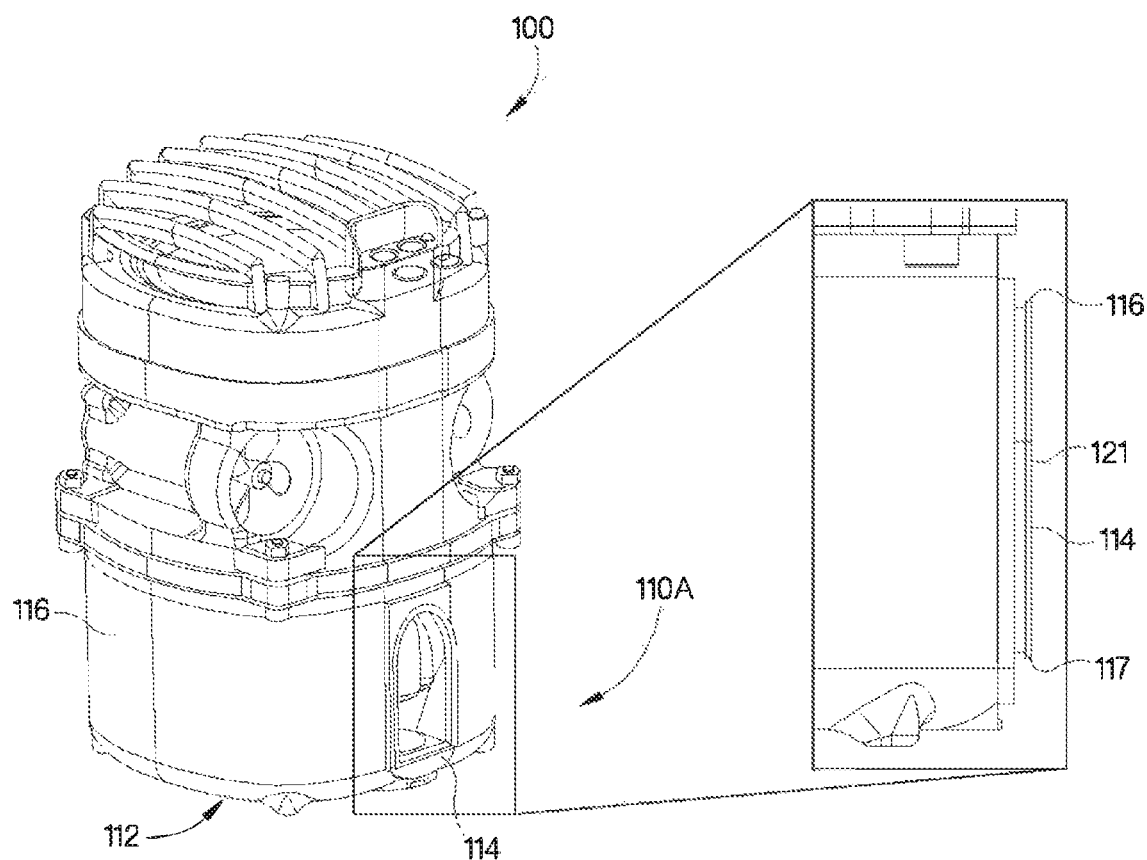
FIG. 10C is a side view of a portion of the inspection vehicle with a filter bag connected to the attachment bracket.
Figure 10C:
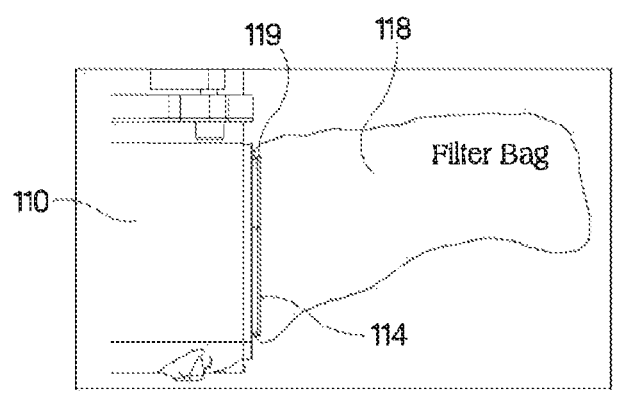

Referring now to FIGS. 10A, 10B and 10C, an inspection vehicle 100 may be configured to perform maintenance and/or repair procedures. The inspection vehicle 100 can include one or more tools for performing maintenance and/or repairs within a housing 13 (See FIG. 1) while remaining filled at least partially with a liquid. In one form, one of the maintenance tools can include a vacuum system 110A. The vacuum system 110A can include an inlet port 112 for receiving entrained solid particle sediment or other foreign objects that become dislodged within the housing 13. Any type of foreign object could be drawn into the inlet port of the inspection vehicle 100 as long as the object has a size or shape suitable for moving through rotatable machinery and internal passageways of the inspection vehicle 100.

In some forms an internal design of the vacuum system 110A can include a system of passageways that provide solid particle separation upstream of any rotating machinery such the solid particles will bypass the rotating pump machinery. In this manner solid particles may be removed without causing surface wear or other structural damage to the rotating pump machinery. An outlet port 114 is formed in a wall of the inspection vehicle 100. The outlet port 114 is in fluid communication with inlet port 112 via one or more internal passageways (not shown) as one skilled in the art would understand. In the exemplary embodiment a filter system can include a filter attachment bracket 116 shown best in FIG. 10B is formed adjacent the outlet port 114. The attachment bracket 116 can include a bracket rim 117 formed about or segmented intermittently about the attachment bracket 116 to facilitate secure attachment means thereto.

In some forms a door (not shown) may be operably connected adjacent the outlet port 114. The door may be opened when the vacuum system 110A is operating and closed at other times as determined by the control system. The filter system can include a filter bag 118 that operably connected to the filter attachment bracket 116 in any number of ways. The filter bag 118 may include a bag rim 119 configured to securely hold the bag 118 with respect to attachment bracket 116. By way of example and not limitation, attachment means used to connect the bag rim 119 to the bracket rim 117 may include threaded fasteners, clips, interference fit, chord/twine, string or other means as one skilled in the art would understand. In one form the filter bag 118 can be initially positioned internal to an outer perimeter wall 121 of the inspection vehicle 100 until the vacuum system becomes operational in order to promote movement of the inspection vehicle 100 without interference. Upon initiation of the vacuum, the filter bag 118 may protrude outward of the outlet port 114 as illustrated in FIG. 10C. In some embodiments, the filter bag 118 protrudes outward from the vehicle housing 16 in all operating conditions. In other embodiments, the vacuum system 110A may include a filter that remains partially or completely within the boundary of the outer perimeter wall 121 of the outlet port 114 during operation of the vacuum system 110.

While not shown in the exemplary embodiment, other forms of filtering or otherwise removing and retaining solid particle objects are contemplated by the present application. For example, a separate container or compartment may be formed within the housing 116 of the inspection vehicle 100. The solid particles may be separated from the liquid flow and become trapped in the container by way of screen or mesh material located adjacent the container or by way of centripetal vortex fluid action as a skilled artisan would understand.

Figure 11A:
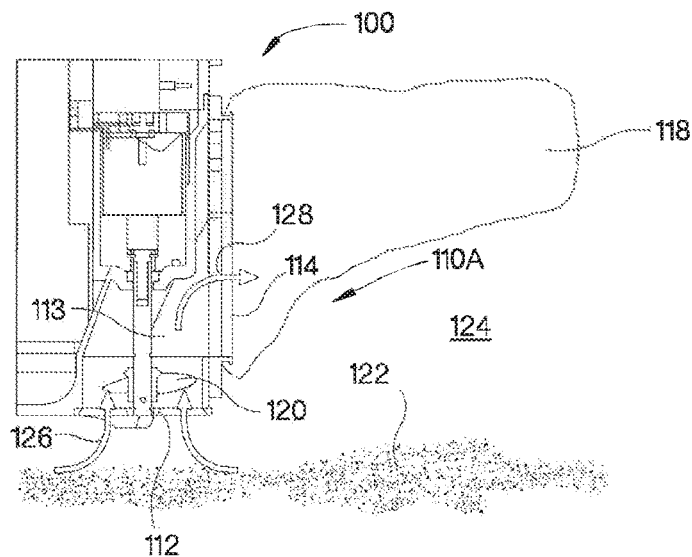
FIG. 11A is a side view of a portion of the inspection vehicle with sediment particles being drawn into the inspection vehicle.
Figure 11B:
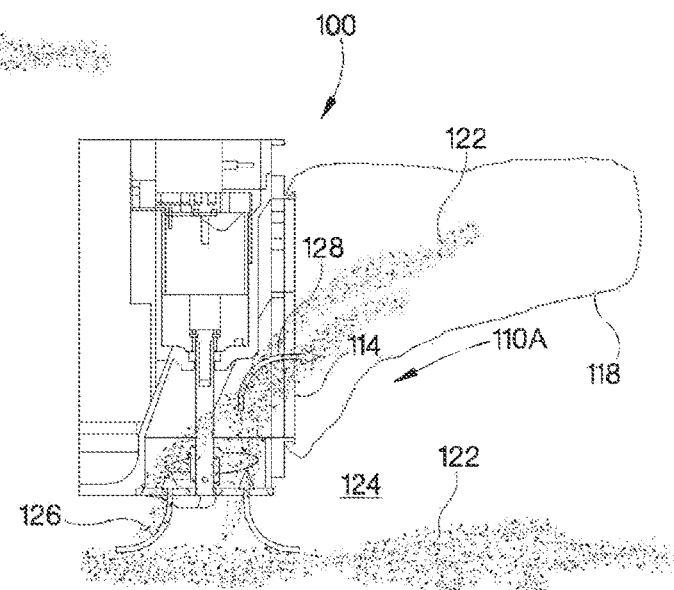
FIG. 11B is a side view of a portion of the inspection vehicle with sediment particles discharged into the filter bag.
Figure 11C:
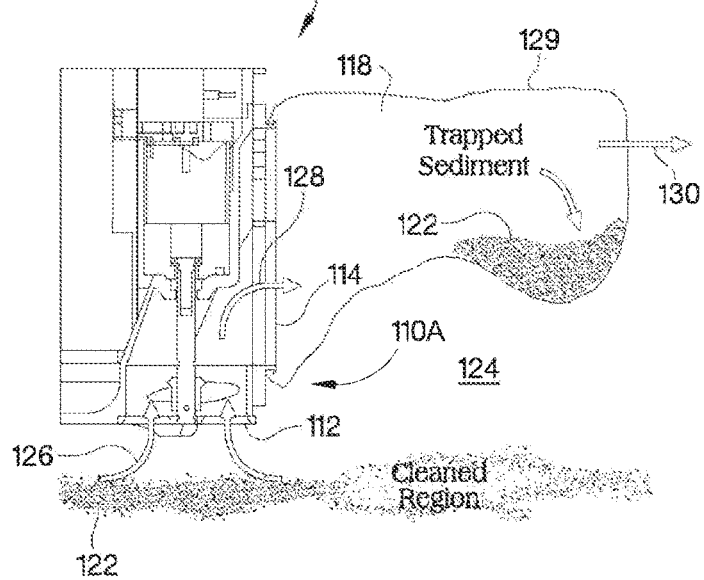
FIG. 11C is a side view of a portion of the inspection vehicle with sediment particles being trapped in the filter bag while liquid is being discharged through from the filter bag.

Referring now to FIGS. 11A, 11B and 11C, operation of the vacuum system 110A of the inspection vehicle 100 is illustrated. In FIG. 11A the inspection vehicle 100 includes a pump 120 operable for providing suction of a liquid medium 124 and causing solid particle sediment 122 to be entrained in an inlet flow stream 126. The pump 120 can also act as a thruster for the inspection vehicle 100 in some embodiments. In other embodiments the pump 120 is separate from the thrusters or other vehicle propelling means. It should also be understood that while a single pump 120 is illustrated in the exemplary embodiment, additional pumps with additional flow passageways are contemplated by this disclosure. The inlet flow stream 126 of liquid 124 and solid particle sediment 122 enters into the inspection vehicle 100 through the inlet port 112, traverses through one or more internal fluid flow paths 113 and exits via an outlet flow stream 128 through the outlet port 114 prior to being discharged into the filter bag 118.

FIG. 11B illustrates solid particles 122 being entrained with the inlet flow stream 126, passing through an internal region of the inspection vehicle 100, exiting through the outlet port 114 and entering into the filter bag 118. FIG. 11C illustrates a portion of the solid particles 122 becoming trapped in the filter bag 118 and that the liquid medium 124 passes through a mesh wall 129 as illustrated by arrow 130. In this manner, solid particle sediment 122 can be trapped in the filter thereby creating a cleaned region within the liquid filled housing 13.

Figure 12:
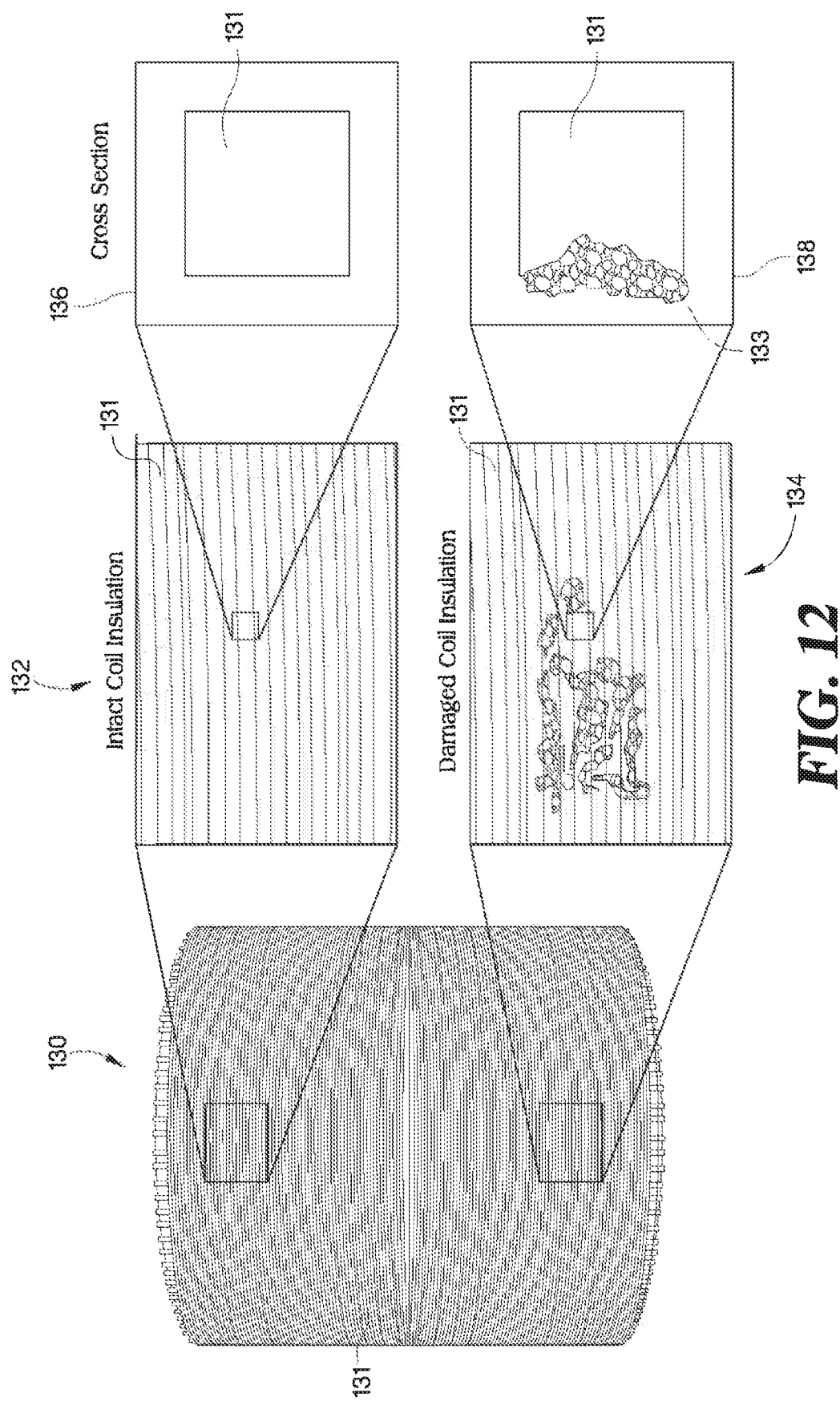
FIG. 12 illustrates a component having damaged portions identified by the inspection vehicle.

Referring now to FIGS. 12, 13A, 13B, 13C, and 13D, the inspection vehicle 100 can be used to repair components within a liquid filled housing (not shown). FIG. 12 depicts a non-limiting example of a component with damaged portions that can be repaired by the inspection vehicle 100. In the illustrative embodiment, the component 130 is an electrical coil 130 having insulation 131 surrounding high tension electrical conductors as is known. An enlarged view 134 of a damaged portion 133 of the coil 130 is shown below an undamaged illustration 132. An enlarged cross sectional view 138 schematically depicts the damaged portion 133 of insulation 131.

Figure 13A:
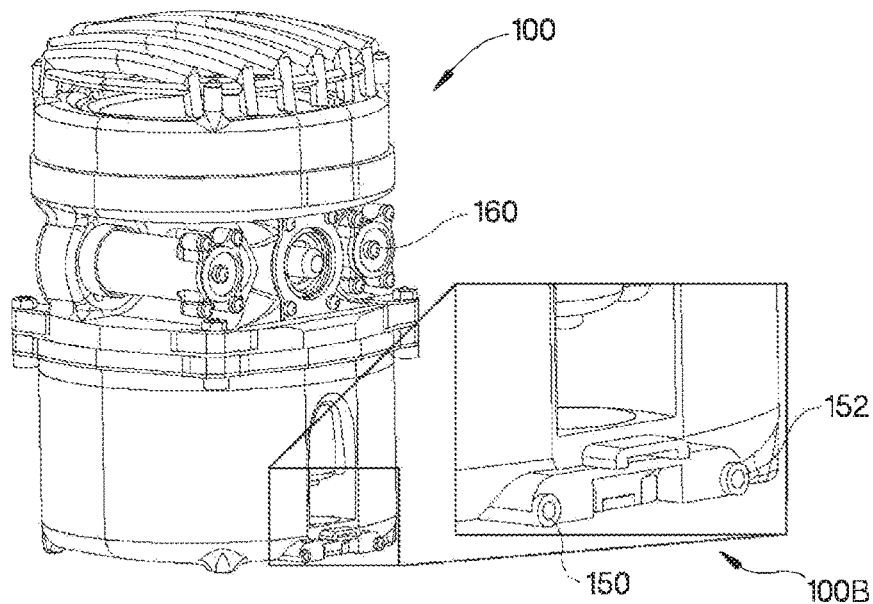
FIG. 13A shows a perspective view of another embodiment of an inspection vehicle with a maintenance tool that includes a plurality of injection nozzles operably coupled thereto.

Referring now to FIG. 13A, the inspection vehicle 100 can include maintenance repair tools such as one or more injection nozzles 110B. In the illustrative embodiment, the inspection vehicle includes a first injection nozzle 150 and a second injection nozzle 152. Although two injection nozzles are shown in the exemplary embodiment, it should be understood that a single injection nozzle or more than two injection nozzles may be utilized in other embodiments. The injection nozzles 110B can be used to make repairs to surface layers or material coatings, as well as load bearing structure repair. Such repairs can include without limitation, insulation repair, crack repair or complete structural repair. The repair methods can include any forms that are viable when the vehicle 100 is submerged in a liquid filled container. The specific formulation of the repair compounds or repair techniques may vary so as to be compatible the liquid. As described previously, in one form the liquid can be a mineral oil, however other liquids are contemplated. The nozzles 110B can be operable to inject repair epoxy, a two part acrylate paste, a UV light hardened epoxy, a pre-impregnated fiberglass patch, or other forms as would be known to those skilled in the art. An additional light source such as UV light 160 can be coupled to the inspection vehicle 100 and used for some repair processes. Also, while not shown, the repair vehicle 100 can include other maintenance tools, such as cutting tools, grinding tools, welding tools, soldering tools, drilling tools as well as other types of tools.

Figure 13B:
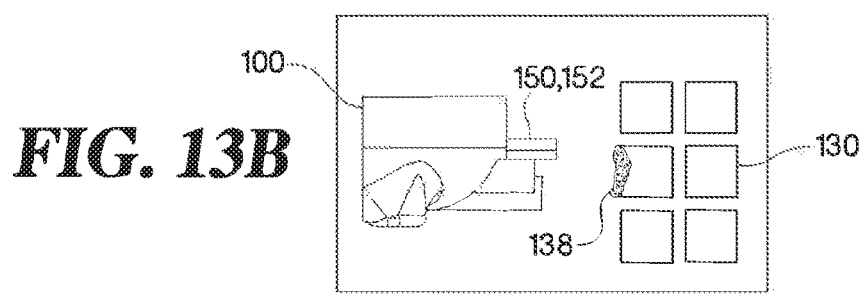
FIG. 13B illustrates a portion of the inspection vehicle of FIG. 13A approaching a damaged component.
Figure 13C:
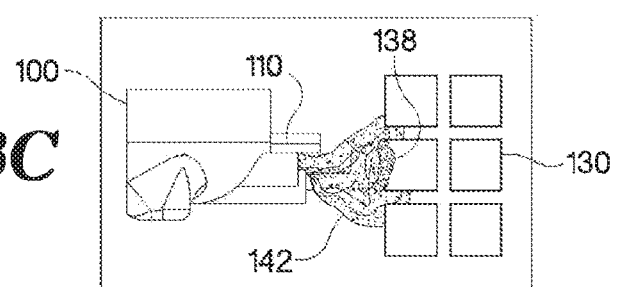
FIG. 13C illustrates a portion of the inspection vehicle of FIG. 13A injecting a liquid repair compound onto the damaged portion of the component.

Referring now to FIG. 13B the inspection vehicle 100 is shown approaching a damaged cross-sectional area 138 of a component 130. The injection nozzles 150, 152 are positioned at a location adjacent the damaged portion 138 of the component 130. After the inspection vehicle 100 is in position as shown in FIG. 13C, the injection nozzles 150, 152 can inject or otherwise discharge a liquid repair compound 142 on to the damaged portion 138 of the component 130.

Figure 13D:
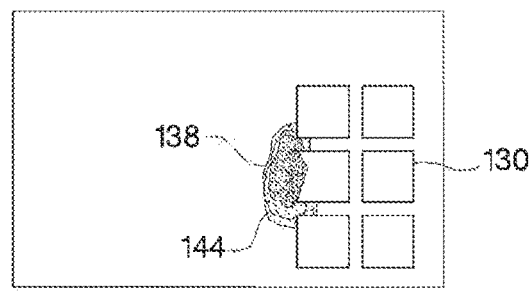
FIG. 13D illustrates a repaired component after the repair compound has hardened.

FIG. 13D illustrates a surface repair such as an insulation layer replacement or the like. The damaged component 138 is repaired after the liquid repair compound 142 becomes a hardened compound 144. As explained above, the exemplary embodiment described herein is only one repair method out the many possible methods that may be contemplated by one skilled in the art.

Figure 14:
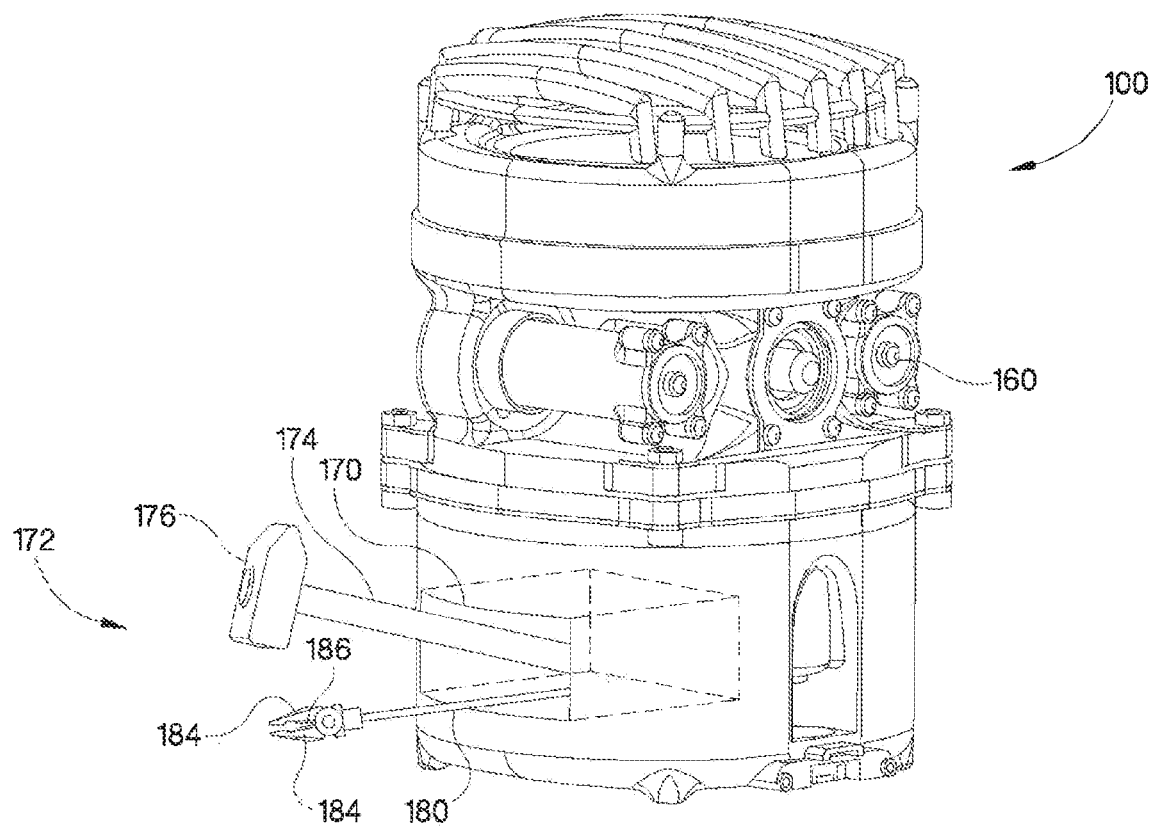
FIG. 14 shows a perspective view of another embodiment of an inspection vehicle with a plurality of exemplary maintenance tools operably associated therewith.

Referring now to FIG. 14, another embodiment of the inspection vehicle 100 is illustrated with additional examples of maintenance tools that may be operably used in some applications. A tool bay 170 may be formed within a portion of the inspection vehicle 100 for storing one or more maintenance tools therein. In some forms the tool bay 170 may partially reside externally to the inspection vehicle 100. In other forms the tool bay 170 may reside entirely externally to an outer housing of the inspection vehicle 100.

One or more tools 172 may be operably coupled with the inspection vehicle 100. When not in use, the tools may be stored in the tool bay 170. The tool bay 170 may have a door (not shown) configured to close an opening when the tools 172 are stored and not in use. In some embodiments a separate tool bay 170 may not be formed with the inspection vehicle 100 and the tools may be coupled to other portions of the inspection vehicle 100. The tools 172 may be deployed from the tool bay 170 when a task identified by the inspection vehicle 100 or an operator is identified.

One or more arms 174, 180 may connect to one or more tools 172. The arms 174, 180 may have telescopic elements and hinge elements so as to provide means for positioning the tools 172 in a desired location and orientation. In non-limiting examples, the tools 170 can include an impact device 176 such as a hammer, gripping jaws 184 and cutting devices 186 as well as other tools that are not illustrated, but would be understood by one skilled in the art. Such tools can include, but are not limited to rotary tools for installing or removing threaded fasteners, magnetic tools and welding tools or the like. In some forms a magnetic device to can be used to magnetically couple the inspection vehicle 100 to a magnetic material within an inspection region or to pick up a magnetic object within the inspection region. The tools 172 may be used to collect debris, pick up and transport objects such as tools or the like, remove and replace parts or components within the liquid filled apparatus, cut objects and perform other maintenance operations as would be known to those skilled in the art.

In one aspect the present disclosure includes an inspection system comprising: an inspection vehicle having a propulsion device operable in a liquid medium; at least one sensor operable with the inspection vehicle; a control system including an electronic controller in electronic communication with the inspection vehicle; and one or more maintenance tools operable with the inspection vehicle.

In refining aspects the one or more maintenance tools include at least one of a suction pump, a grasping device, a cutting device, an impact device, a magnet, a welder and a rotary tool; wherein the suction pump is in fluid communication with an inlet port formed in a housing of the inspection vehicle; an outlet port formed in the housing of the inspection vehicle, the outlet port in fluid communication with the inlet port; wherein the suction pump is operable for drawing in a quantity of the liquid with entrained solid particulate through the inlet port and for discharging the liquid and solid particulate through the outlet port; further comprising a filter positioned proximate to the outlet port, the filter configured to trap solid particulate and permit liquid to flow therethrough; wherein the suction pump includes a rotatable impeller; wherein the impeller is operable to also provide a propelling thrust for the inspection vehicle within the liquid medium; wherein the one or more maintenance tools includes a repair apparatus; wherein the repair apparatus includes one or more injector nozzles coupled to the inspection vehicle; wherein the sensor transmits a location of a damaged component and the inspection vehicle is maneuvered to the location and the one or more injector nozzles eject a liquid repair compound onto the damaged component; wherein the repair compound is capable of curing in the liquid medium; wherein liquid medium includes one of a petroleum base mineral oil, a synthetic oil or other non-aqueous liquid; and wherein the liquid repair compound includes one of a two part acrylic paste, a UV hardening adhesive, a pre-impregnated fiberglass patch or a combination thereof; and wherein the repair apparatus is operable to repair a structural defect, an outer surface defect and/or an insulation layer defect.

In another aspect the present disclosure includes a method for performing maintenance operations within a housing at least partially filled with a liquid, the method comprising: moving a liquid propelled inspection vehicle within the housing; sensing, with a sensor, a region within the housing that requires maintenance; and performing a maintenance procedure on the region with the inspection vehicle.

In refining aspects the maintenance procedure includes at least one of suction of liquid and solid particle debris into the inspection vehicle and discharging the solid particle debris into a filter, grasping and moving an object, cutting an object, threading or unthreading a threaded fastener, impacting an object, and welding; wherein the maintenance procedure includes repairing an outer surface and/or repairing a structural defect of a component within the housing; wherein the component is high tension coil and the outer surface is at least partially formed from an insulation material; wherein the repairing includes ejecting a liquid compound from the inspection vehicle onto the component; wherein the liquid compound includes one of a two part acrylic paste, a UV hardening adhesive or a pre-impregnated fiberglass patch; and further comprising curing the liquid compound with a light source.

In another aspect an inspection and maintenance system comprising: an inspection vehicle maneuverable within a housing at least partially filled with a liquid medium; a control system operable for locating an area requiring maintenance and/or repair; and one or more tools operably coupled with the inspection vehicle configured to perform a repair procedure and/or a maintenance procedure on a component surrounded by the liquid medium.

In refining aspects the inspection and maintenance wherein the one or more tools are configured for a vacuum system; wherein the vacuum system includes a suction pump in fluid communication with an inlet port and an outlet port formed in a housing of the inspection vehicle; wherein the vacuum system includes a filter in fluid communication with the inlet port; wherein the one or more tools are configured for a repair system; and wherein the repair system includes one or more injection nozzles coupled to the inspection vehicle, the one or more nozzles configured to eject a repair compound onto a damaged component; wherein the repair compound is formed to cure and harden in the liquid medium; and wherein the one or more tools include a grasping device, a cutting device, an impact device, a magnet, a welder and a rotary tool.

While the application has been illustrated and described in detail in the drawings and foregoing description, the same is to be considered as illustrative and not restrictive in character, it being understood that only the preferred embodiments have been shown and described and that all changes and modifications that come within the spirit of the applications are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An inspection system for an enclosed tank that includes a sealed configuration, the system comprising:
   an inspection vehicle having a propulsion device operable in the enclosed tank that has the sealed configuration and that is at least partially filled with a liquid medium;
   at least one sensor that is carried by and operable with the inspection vehicle;
   a control system including an electronic controller in electronic communication with the inspection vehicle; and
   one or more maintenance tools operable with the inspection vehicle,
   wherein the sensor is configured to transmit a location of a damaged structural component and the inspection vehicle is configured to be maneuvered to the location, and
   wherein the sensor is configured to identify the damaged structural component from among non-damaged components.

2. The inspection system of claim 1, wherein the one or more maintenance tools includes at least one of a grasping device, a cutting device, an impact device, a magnet, a welder and a rotary tool.

3. The inspection system of claim 2, wherein the one or more maintenance tools includes a suction pump, and
   wherein the suction pump is in fluid communication with an inlet port formed in a housing of the inspection vehicle.

4. The inspection system of claim 3, further comprising an outlet port formed in the housing of the inspection vehicle, the outlet port in fluid communication with the inlet port.

5. The inspection system of claim 4, wherein the suction pump is operable for drawing in a quantity of the liquid with entrained solid particulate through the inlet port and for discharging the liquid medium and solid particulate through the outlet port.

6. The inspection system of claim 4 further comprising a filter positioned proximate to the outlet port, the filter configured to trap solid particulate and permit liquid to flow therethrough.

7. The inspection system of claim 2, wherein the one or more maintenance tools includes a suction pump, and
   wherein the suction pump includes a rotatable impeller.

8. The inspection system of claim 7, wherein the impeller is operable to also provide a propelling thrust for the inspection vehicle within the liquid medium.

9. The inspection system of claim 1, wherein the one or more maintenance tools includes a repair apparatus.

10. The inspection system of claim 9, wherein the repair apparatus includes one or more injector nozzles coupled to the inspection vehicle.

11. The inspection system of claim 10, wherein the one or more injector nozzles is configured to eject a liquid repair compound onto the damaged component.

12. The inspection system of claim 11, wherein the repair compound is capable of curing in the liquid medium.

13. The inspection system of claim 12, wherein liquid medium includes one of a petroleum base mineral oil, a synthetic oil or other non-aqueous liquid.

14. The inspection system of claim 11, wherein the liquid repair compound includes one of a two part acrylic paste, a UV hardening adhesive, a pre-impregnated fiberglass patch or a combination thereof.

15. The inspection system of claim 9, wherein the repair apparatus is operable to repair a structural defect, an outer surface defect and/or an insulation layer defect.

16. The inspection system of claim 1, wherein the sensor comprises at least one of a thermal camera, a sonar camera, a radar sensor and a three-dimensional vision sensor.

17. A method for performing maintenance operations within a housing at least partially filled with a liquid, the method comprising:
   moving a liquid propelled inspection vehicle within the housing;
   sensing, with a sensor, a region within the housing that requires maintenance; and
   performing a maintenance procedure on the region with the inspection vehicle,
   wherein the maintenance procedure includes repairing an outer surface and/or repairing a structural defect of a component within the housing, and
   wherein the component is a high tension coil and the outer surface is at least partially formed from an insulation material.

18. The method of claim 17, wherein the maintenance procedure includes at least one of suction of liquid and solid particle debris into the inspection vehicle and discharging the solid particle debris into a filter, grasping and moving an object, cutting an object, threading or unthreading a threaded fastener, impacting an object, and welding.

19. The method of claim 17, wherein the repairing includes ejecting a liquid compound from the inspection vehicle onto the component.

20. The method of claim 19, wherein the liquid compound includes one of a two part acrylic paste, a UV hardening adhesive or a pre-impregnated fiberglass patch.

21. The method of claim 19, further comprising curing the liquid compound with a light source.

22. An inspection and maintenance system comprising:
   an inspection vehicle maneuverable within a housing at least partially filled with a liquid medium;
   a control system operable for locating an area requiring maintenance and/or repair; and
   one or more tools operably coupled with the inspection vehicle configured to perform a repair procedure on a component surrounded by the liquid medium,
   wherein the repair procedure includes repairing an outer surface and/or repairing a structural defect of the component surrounded by the liquid medium.

23. The inspection and maintenance system of claim 22, wherein the one or more tools are configured for a vacuum system.

24. The inspection and maintenance system of claim 23, wherein the vacuum system includes a suction pump in fluid communication with an inlet port and an outlet port formed in a housing of the inspection vehicle.

25. The inspection and maintenance system of claim 24, wherein the vacuum system includes a filter in fluid communication with the inlet port.

26. The inspection and maintenance system of claim 22, wherein the one or more tools are configured for a repair system.

27. The inspection and maintenance system of claim 26, wherein the repair system includes one or more injection nozzles coupled to the inspection vehicle, the one or more nozzles configured to eject a repair compound onto a damaged component.

28. The inspection and maintenance system of claim 27, wherein the repair compound is formed to cure and harden in the liquid medium.

29. The inspection and maintenance system of claim 22, wherein the one or more tools include a grasping device, a cutting device, an impact device, a magnet, a welder and a rotary tool.

* * * * *